United States Patent

[11] 3,602,802

| [72] | Inventors | Albert Y. Chan<br>Montvale;<br>Haig Soojian, Upper Saddle River, both of, N.J. |
|---|---|---|
| [21] | Appl. No. | 59,195 |
| [22] | Filed | July 29, 1970 |
| [45] | Patented | Aug. 31, 1971 |
| [73] | Assignee | Philips Broadcast Equipment Corporation<br>Montvale, N.J. |

[54] REMOTE VOLTAGE REGULATED POWER SUPPLY
9 Claims, 1 Drawing Fig.

[52] U.S. Cl. .................................................... 323/19,
307/103, 323/100, 325/394
[51] Int. Cl. ...................................................... G05f 1/46
[50] Field of Search .......................................... 219/132;
325/37, 66, 394, 492; 323/1, 16, 19, 100; 328/103;
340/310; 307/103

[56] References Cited
UNITED STATES PATENTS

| 3,513,379 | 5/1970 | Spann............................ | 323/16 |
| 2,188,498 | 1/1940 | Curtis et al. .................. | 325/394 X |
| 3,467,835 | 9/1969 | DeCola ....................... | 340/310 X |

Primary Examiner—J. D. Miller
Assistant Examiner—A. D. Pellinen
Attorney—Frank R. Trifari ABSTRACT: A regulated power supply for a remote load features a differential amplifier located at the load which compares the load voltage to a reference voltage. The difference voltage thus generated is used to control the frequency of a VCO whose output signal is sent along a power cable to the power supply. There an FM discriminator detects the signal and controls the output voltage of the power supply so as to keep the load voltage constant.

PATENTED AUG 31 1971          3,602,802
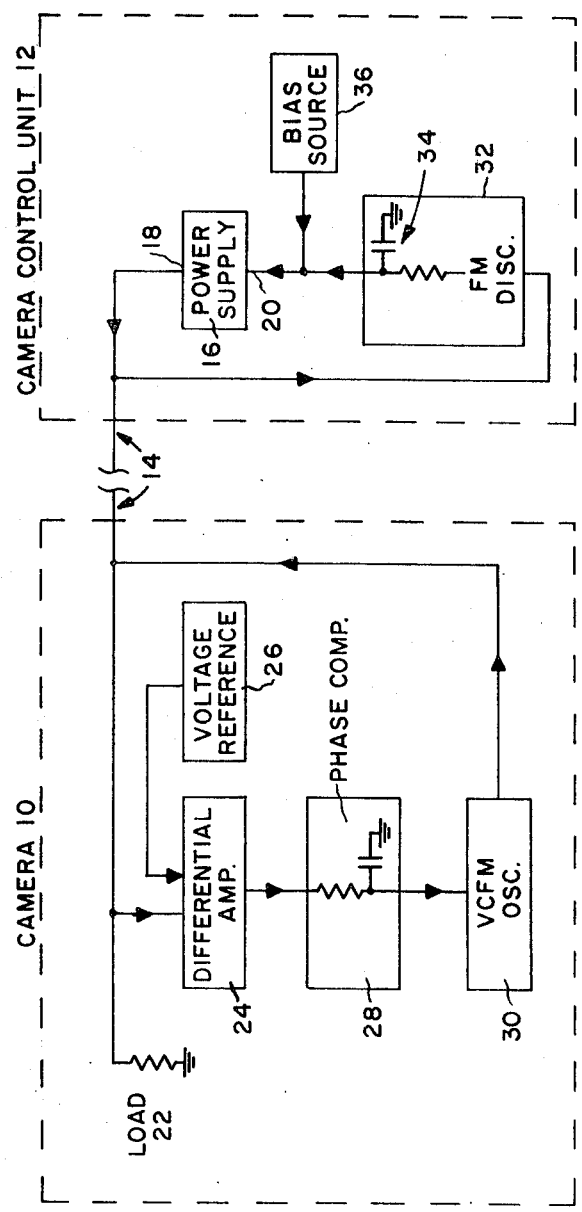
INVENTORS.
ALBERT Y. CHAN
HAIG SOOJIAN
BY
AGENT

REMOTE VOLTAGE REGULATED POWER SUPPLY

This invention relates to regulated power supplies which are remote from the load and more particularly to ones located in control units for a remote camera.

In television broadcasting it is frequently desirable to place a camera at one location and have a camera control unit (CCU) at another location. The CCU, in addition to generating signals for the control of the various camera functions, e.g. focus, intensity, video gain, etc., must supply direct current power for the camera. Since the camera and the CCU can be as much as 1 mile apart, a large voltage drop along the cable connecting them takes place, and some form of regulation of the power supply is necessary to keep the voltage at the camera constant independently of such factors as variation of the length of the cable between the camera and the CCU or resistance changes in the cable caused by ambient temperature changes, etc. Because of cost considerations, modern practice calls for a cable of at most three conductors, and therefore, the voltage regulation must be achieved without increasing the number of conductors.

It is therefore an object of the present invention to regulate a load voltage by regulating the output voltage of a remote power supply.

It is another object to regulate the load voltage without increasing the number of conductors connecting the load to the supply.

It is still another object to regulate the load voltage at a camera where the power is coming from a camera control unit.

In brief, these and other objects are achieved by having a means for detecting the value of the load voltage and transmitting a signal containing this value to the power supply through the same transmission path as that through which the DC power is transmitted. At the power supply, a means for detecting the transmitted signal controls the power supply output voltage such that the load voltage is kept constant.

These and other objects will become apparent from the following description taken in conjunction with the accompanying drawing in which:

The sole FIGURE is schematic block drawing of the invention.

The FIGURE shows the two basic units of the invention, the camera 10 and the camera control unit (CCU) 12, connected together by a cable 14, which can be of almost any desired length, e.g. 1 mile. Within the CCU 12 is a voltage variable power supply 16, which has a power output terminal 18 connected to the cable 14, and a control terminal 20. Therefore, power flows from the terminal 18, through the cable 14, which because of its great length, absorbs a large portion of it, to the camera 10. At the camera 10, almost all of the power is used by load 22. Although this load 22 is represented in the FIGURE by a resistor, it is understood that it is actually made up of the various circuits of a remotely controlled camera. The voltage across the load 22 is sensed by a differential amplifier 24 which compares it with the voltage from a voltage reference source 26 and generates an amplified difference signal at its output. The voltage reference source 26 can be a voltage regulator tube, a Zener diode, or, in general, any element which can establish the necessary reference voltage, which typically is 105 volts. The amplified difference voltage is applied to an RC low-pass filter phase compensation circuit 28, which has a one or two Hz. cut off frequency, and then to the control terminal of a voltage controlled frequency modulated oscillator 30. This oscillator has a nominal frequency of 200 kHz. Thus, the extent to which the load voltage differs from the reference voltage will be reflected in the frequency deviation of the oscillator 30. The output signal of the oscillator 30 is applied to the cable 14, and therefore sent to the CCU 12, where it is detected by the FM discriminator 32. Within the discriminator 32 is an RC filter 34 so that a nearly direct current signal is applied to the control terminal 20. The time constant of filter 34 is about one millisecond, which is fast enough for the control voltage to follow any possible changes in the resistance of the cable 14 caused by temperature changes. Also applied to the terminal 20 is a DC voltage from a bias source 36, which ensures that there is always some minimum voltage output from the supply 16.

In operation, the power supply 16 is turned on, and because of the bias source 36, there is a low voltage, typically 24 volts at the terminal 18. This low voltage is enough to operate the circuits 24 to 30 located at the camera. Also, if the cable 14 should break, the voltage at any possible open end of the cable will be only this low value, rather than the normal voltage, which is much higher. The circuits 24–30, operating on the low voltage, generate an FM signal which indicates that the voltage across the load 22 is much smaller than the reference voltage. This signal is detected at the CCU 12 by the discriminator 32 which generates a control voltage causing the output voltage at terminal 18 to be raised to a potential sufficient to result in a zero difference signal output from the amplifier 24. Typically, about 200 volts is required at terminal 18 to produce 105 volts across the load 22 if cable 14 is 1 mile long. Within the supply 16 there is a time delay between any change of the potential of the terminal 20 and the resultant change in the potential of the terminal 18. In addition, there is a time delay along the cable 14. Therefore, if the filter 28 was not present in the present circuit, it would be possible that the present voltage regulator circuit could oscillate at some frequency.

It is understood that the above embodiment is merely illustrative of the inventive concept herein disclosed any that many other embodiments are possible without departing from the scope of the present invention.

What is claimed is:

1. An apparatus for controlling the voltage at a load comprising: a controllable power supply, a transmission path connected between said supply and the load, detecting means located proximate said load for producing a detected signal containing information having the value of the voltage at said load, means for transmitting said detected signal containing the information of the value of said load voltage through said transmission path comprising an oscillator modulated by said load voltage detecting means, means located at said power supply for detecting said transmitted signal, and means for controlling said load voltage at a substantially constant value including means for applying said detected signal to said controllable power supply.

2. An apparatus as claimed in claim 1 wherein said load voltage detecting means comprises a source of a reference voltage, and a differential amplifier having inputs coupled to said load and said voltage reference source respectively.

3. An apparatus as claimed in claim 1 wherein said oscillator comprises a voltage controlled frequency modulated oscillator.

4. An apparatus as claimed in claim 1 wherein load voltage detecting means further comprises a phase compensation circuit.

5. An apparatus as claimed in claim 4 wherein said compensating circuit comprises a series resistor shunt capacitor circuit.

6. An apparatus as claimed in claim 1 wherein transmitted signal detecting means comprises a frequency modulation discriminator.

7 An apparatus as claimed in claim 1 wherein said transmitted signal detecting means further comprises a filter.

8. An apparatus as claimed in 7 wherein said filter comprises a series resistor-shunt capacitor circuit.

9. An apparatus as claimed in claim 1 wherein said power supply further comprises means for setting a minimum voltage output of said supply.